United States Patent [19]

Fogal

[11] Patent Number: 4,950,505
[45] Date of Patent: Aug. 21, 1990

[54] METHOD FOR REFINISHING A RIM/WHEEL

[75] Inventor: Robert D. Fogal, Chambersburg, Pa.

[73] Assignee: International Marketing, Inc., Chambersburg, Pa.

[21] Appl. No.: 333,381

[22] PCT Filed: May 22, 1987

[86] PCT No.: PCT/US87/01169
§ 371 Date: Jan. 23, 1989
§ 102(e) Date: Jan. 23, 1989

[87] PCT Pub. No.: WO88/09234
PCT Pub. Date: Dec. 1, 1988

[51] Int. Cl.$^5$ .............................................. B05D 3/12
[52] U.S. Cl. ................................ 427/327; 427/388.1; 134/123; 134/134
[58] Field of Search ................... 29/159.1; 134/25.4, 134/134, 84, 123; 72/53; 427/327, 388.1

[56] References Cited

U.S. PATENT DOCUMENTS

| | | |
|---|---|---|
| 1,151,969 | 8/1915 | Schock . |
| 2,249,677 | 7/1941 | Wallace . |
| 2,249,678 | 7/1941 | Wallace . |
| 2,341,674 | 2/1944 | Wallace . |
| 2,542,955 | 2/1951 | Young et al. . |
| 3,252,401 | 5/1966 | Smith . |
| 3,312,567 | 1/1962 | Sharpe . |
| 3,475,936 | 10/1966 | Steele . |
| 3,546,816 | 10/1967 | Enegren . |
| 3,797,174 | 3/1974 | Hazlewood . |
| 3,906,894 | 9/1975 | Pesapane . |
| 4,096,300 | 6/1978 | William et al. . |
| 4,228,671 | 10/1980 | Skeen . |
| 4,268,206 | 5/1981 | Johnson . |
| 4,311,111 | 1/1982 | Inaba . |
| 4,604,881 | 8/1986 | Lienert . |
| 4,665,655 | 5/1987 | Woodward . |
| 4,668,358 | 5/1987 | Ball . |
| 4,763,392 | 8/1988 | Fogal et al. .............. 29/159.1 |

OTHER PUBLICATIONS

Viking Brochures "Swedebrator" and "Waterblaster" Apr. 1985.
Viking Corporation Product Information dated 8/11/86.

Primary Examiner—P. W. Echols
Attorney, Agent, or Firm—Diller, Ramik & Wight

[57] ABSTRACT

A machine (10) for refinishing a rim/wheel (R) by first elevating (20) the rim/wheel from ground level into a washing and degreasing chamber (13), washing and degreasing the rim/wheel in the chamber (13), transferring the rim/wheel into a shot blast chamber (14), shot-blasting the rim/wheel, transferring the rim/wheel to a spray coating area (15), spray-coating the rim/wheel with a protective material (C), and thereafter returning the rim/wheel to its initial elevation for subsequent tire/retread application thereto (20). The rim/wheel is transferred through the machine with its axis in a generally horizontal plane FIG. 1) and is also rotated about its axis during washing/degreasing and shot-blasting. During the spray coating, the rim/wheel is coated with its axis disposed both vertically and horizontally.

31 Claims, 6 Drawing Sheets

METHOD FOR REFINISHING A RIM/WHEEL

CROSS-REFERENCE TO RELATED APPLICATIONS

The method and apparatus disclosed herein relates to commonly assigned application Ser. No. 07/036,659 filed Apr. 10, 1987 now U.S. Pat. No. 4,763,392 and entitled METHOD OF MANUFACTURING A TOTALLY COATED TIRE RIM in the names of Robert D. Fogel and Albert A. Tabor, and the totality of the disclosure of the latter-identified application is incorporated herein by reference.

BACKGROUND OF THE INVENTION

The present invention is directed to refinishing or reconditioning rims or wheels of motor vehicles, such as trucks, automobiles, tractors, trailers, or the like.

A truck rim is very rarely serviced from the day a tire is first mounted thereon and any number of retreads or new tires are remounted thereon. Such truck rims or wheels are subject to virtually constant use under most adverse coditions of nature, terrain and the like. Quite simply, the more commercial vehicles are used or are "on the road," the more profitable is the return on investment. Accordingly, the wheels and rims are normally removed from trucks, tractors, trailers, or the like, new tires or retreads are mounted thereon, and these rims and wheels are returned to service with most unfortunate consequences, as evidenced by recent national reports confirming the high incidents of large vehicle accidents in proportion to the lesser number of such vehicles on the road as compared to passenger automobiles. If a truck wheel or rim is not cleaned, refurbished and/or refinished or is not even incidentally inspected before being returned to service, the truck upon which the rim or wheel is mounted is a potential rolling disaster. Accordingly, the present invention provides a novel method of and apparatus for refinishing truck or similar vehicle wheels and rims so that when remounted with retreads or new tires on vehicles, the safety factor of the refinished rims and/or wheels are comparable and even better than when new.

SUMMARY OF THE INVENTION

The present invention is directed to a novel method of and apparatus for refinishing truck or similar wheels and rims by rotating a rim/wheel in a first chamber and subjecting the same to a hot high-pressure water spray for cleaning and degreasing purposes, transferring the rim/wheel to a second chamber in which the rim/wheel is again rotated and shot-blasted to remove dirt, rust, debris and paint therefrom, removing the rim/wheel from the second chamber, and thereafter applying a complete coating of polymeric protective material upon the rim/wheel whereby a retread or a new tire applied thereto will be assured of safety and performance, extended wear and service life and low future maintenance, all accomplished in a matter of minutes at low costs.

In further keeping with this invention, the rim/wheel is preferably rotated in both chambers when its axis is disposed in a generally horizontal plane and the coating of polymeric material is applied by spraying when the rim/wheel is disposed in two positions with the axis thereof respectively vertical and horizontal.

Another object of this invention is to provide a novel refinishing method and apparatus in which the rim/wheel is elevated from floor level over an arcuate path of travel to the first chamber, conveyed from the first chamber to the second chamber, painted and subsequently relowered along an arcuate path back to floor level.

Still another object of this invention is to provide a novel refinishing method and apparatus as aforesaid wherein an ejection mechanism is utilized with each chamber to effectively eject each rim/wheel by rotation thereof along its axis.

With the above and other objects in view that will herein after appear, the nature of the invention will be more clearly understood by reference to the following detailed description, the appended claims and the several views illustrated in the accompanying drawings.

BRIEF DESCRIPTION OF THE DRAWINGS

FIG. 2 is a highly schematic front elevational view of the refinishing apparatus of FIG. 1, and illustrates the various stations with the elevating and lower stations rotated 90 degrees for clarity.

FIG. 4, which appears on the sheet of drawings containing FIG. 2, is a fragmentary cross-sectional view taken generally along line 4—4 of FIG. 2, and illustrates a rim/wheel in the shot blast chamber.

FIG. 8, which appears on the sheet of drawings containing FIG. 6, is an enlarged cross-sectional view taken generally along line 8—8 of FIG. 7, and illustrates the synthetic polymeric protective material being applied to the rim/wheel during the rotation thereof about a vertical axis.

DESCRIPTION OF THE PREFERRED EMBODIMENT

A novel machine or apparatus constructed in accordance with this invention for refinishing wheels or rims R of relatively large vehicles, such as trucks, tractors, trailers, and the like, is generally designated by the reference numeral 10.

The machine 10 includes a frame or framework 11, an elevating station 12 for elevating each rim or wheel R (hereinafter rim/wheel R) from ground level to a high-pressure, hot water washing and degreasing station 13, a shot-blasting station 14, a polymeric resin coating or painting station 15 and a lowering or discharge station 16. A second rim/wheel elevating station 17 is utilized to lift rims/wheels R from ground level directly to the shot blast station 14 thereby by-passing the high-pressure, hot water washing and degreasing station 13 should rim/wheels R be sufficiently free of grease, grime, dirt and the like for direct shot-blasting at the blast station 14. Conveyor means 18 which will be described more fully hereinafter convey or transfer each rim/wheel from right-to-left, as viewed in FIGS. 1 and 2, during the refinishing thereof.

The elevating stations 12, 17 and the lowering station 16 are virtually identical in construction, and each includes means in the form of an L-shaped platform 20 defined by a plate 21 and a ramp plate 22 which is welded to the base plate 21 at substantially 90 degrees thereto. Each ramp plate 22 is also welded to generally parallel side guide plate 23. A pair of cylindrical sleeves 24 (FIG. 7) are welded or otherwise secured to an upper end portion (unnumbered) of each of the ramp plates 22, and a cylindrical pivot pin 25 is received in and projects outwardly of the cylindrical sleeves 24. The sleeves 24 are welded or adjustably locked to the pivot pin 25 by radial set screws or bolts 26. The ends of each pivot pin 25 are journalled for rotation in bearing blocks 27 which are suitably welded or bolted to the frame 11.

Figure 1:
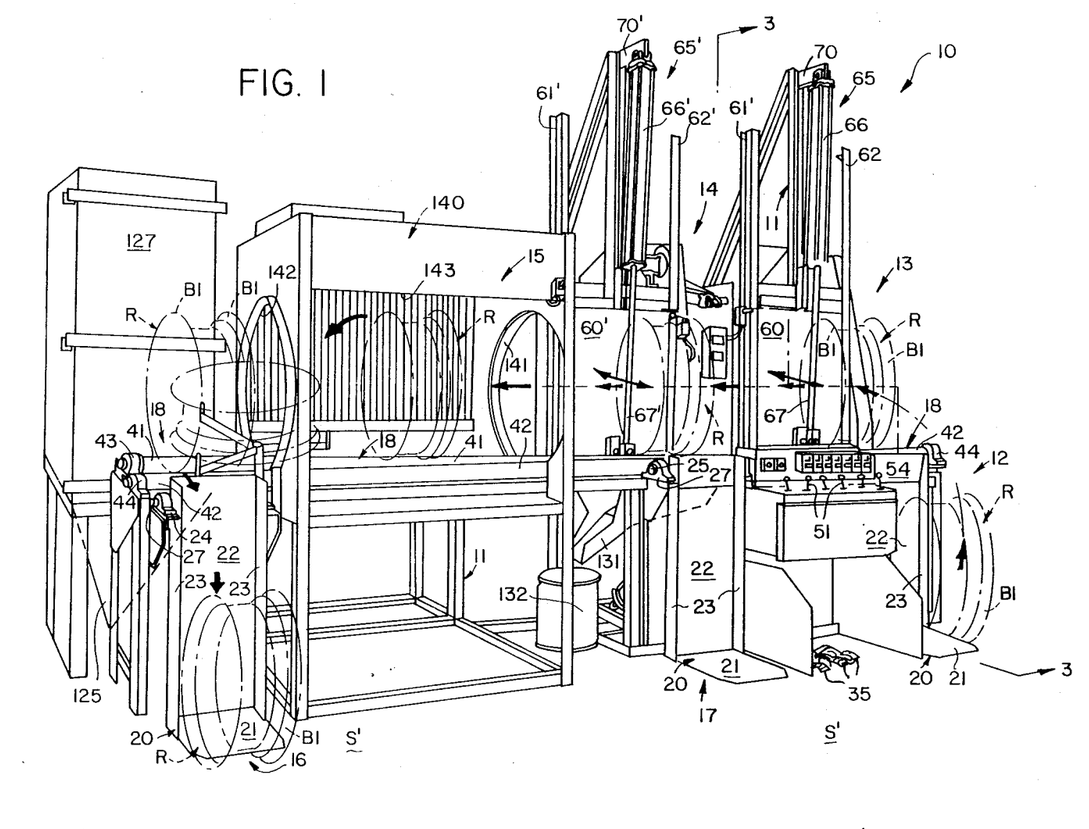
FIG. 1 is a front perspective view of a novel refinishing apparatus or machine of this invention, and illustrates a rim/wheel in phantom outline progressively moving from right-to-left between an elevating station, a pressurized hot liquid washing and degreasing station, a shot-blasting station, a painting station, and a lowering station.
Figures 2, 4:
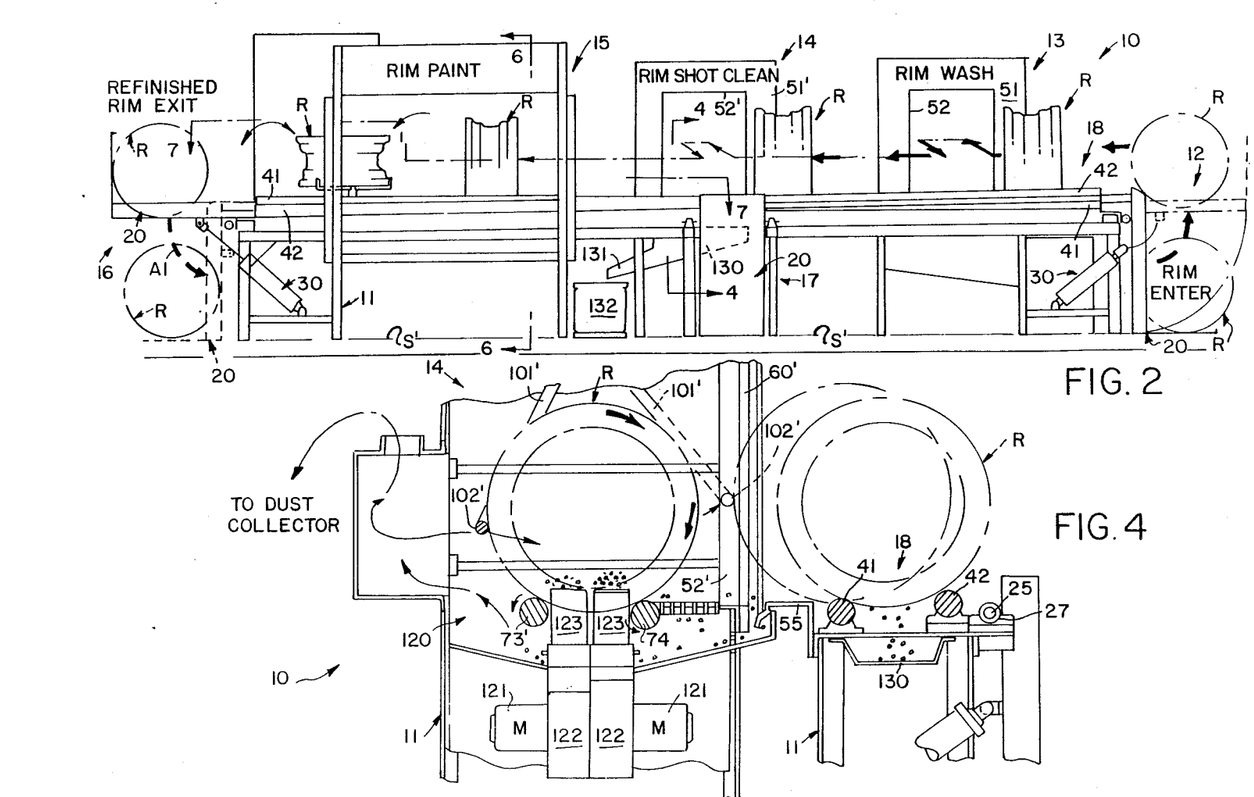
Figure 3:
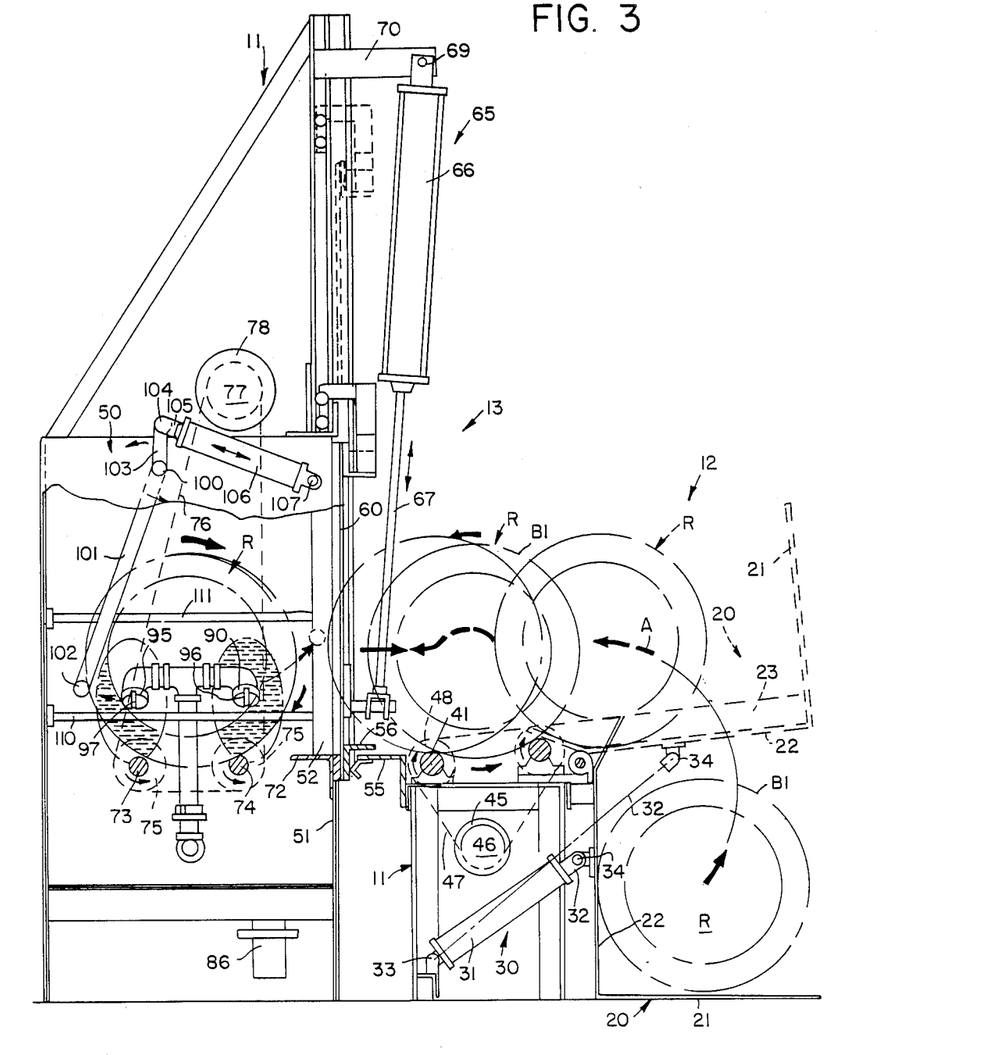
FIG. 3 is an enlarged cross-sectional view taken generally along line 3—3 of FIG. 1, and illustrates details of the high-pressure cleaning and degreasing station, a rim/wheel ejector thereof, and a pivoting platform at the elevating station.
Figure 6:
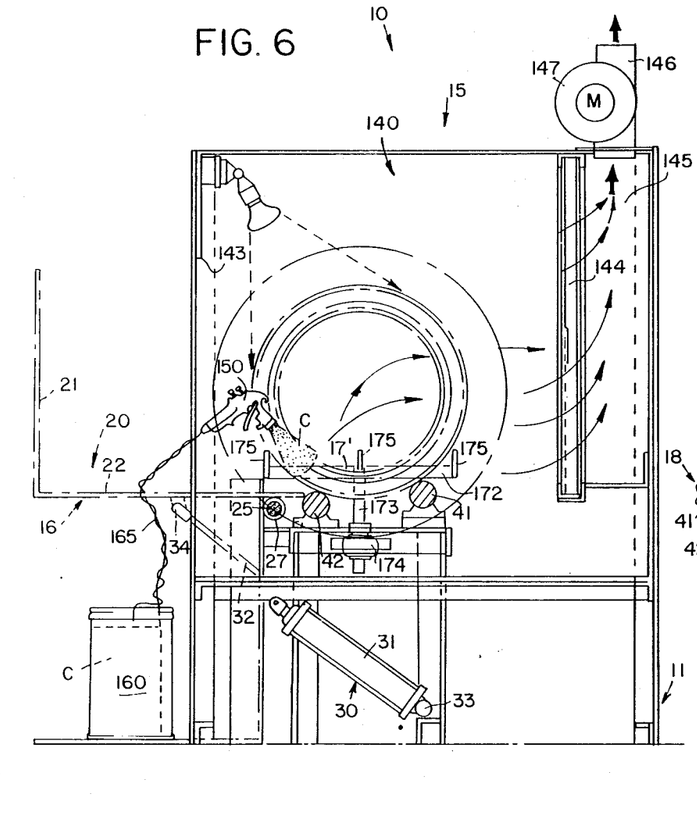
FIG. 6 is an enlarged cross-sectional view taken generally along line 6—6 FIG. 2, and illustrates a rim/wheel being sprayed with polymeric material during the rotation of the rim/wheel about a horizontal axis.

Means 30 (FIG. 3) in the form of a fluid cylinder 31 housing a reciprocal piston rod 32 is provided for pivoting each platform 20 between the positions thereof shown in FIG. 1 at which the base plates 21 rest upon and are generally parallel to the support surface S' of the machine 10, and the positions shown in phantom outline in FIGS. 3 and 6 at which the ramp plates 22 are disposed generally in a horizontal plane. A conventional pivotal connection 33 (FIG. 3) connects each cylinder 31 to an appropriate portion of the frame 11 and a like conventional pivotal connection 34 pivotally connects each piston rod 32 to the associated ramp plate 22. A fluid pressure source (not shown) is connected by conventional lines (also not shown) to the head and rod ends of the cylinder 31 and by operating appropriate foot pedals 35 (FIG. 1) an operator can selectively extend or retract the piston rods 32 relative to the cylinders 31. As an example, by depressing one of the foot pedals 35 after a rim/wheel R has been positioned upon the base plate 21 of the elevating station 12, as shown in FIG. 1, the piston rod 32 will be extended thereby pivoting the platform 20 (FIG. 3) from the solid to the phantom outline position in FIG. 3 about a generally horizontal axis defined by the pivot pin 25. In this manner the platform 20 elevates the rim/wheel along a generally arcuate path of travel A between the solid and phantom outline positions of the platform 20 illustrated in FIG. 3 to thereby raise the rim/wheel R to a position immediately adjacent the high-pressure, hot water washing and degreasing station 13. Obviously, at the lowering station 16 each refinished rim/wheel R is rolled upon the ramp plate 22 when in a horizontal position after which the associated piston rod 32 is retracted into the cylinder 31 to lower the refinished rim/wheel R to the surface S', again along an arcuate path of travel A1 (FIG. 2).

The conveying means 18 (FIGS. 1, 2 and 3) run the length of the machine 10 and are defined by two generally cylindrical rollers 41, 42 transversely spaced from each other (FIGS. 3 and 4) in generally parallel relationship and mounted for rotation at opposite ends of the machine 10 in journals 43, 44, respectively. While the rollers 41, 42 are generally parallel to each other, as viewed along the length thereof, the elevations of upper surfaces (unnumbered) are not aligned and, in fact, cross at approximately the mid-point of the length of the rollers 41, 42, as is best illustrated in FIG. 2. Referring specifically to FIG. 2, the left-hand end of the roller 41 in FIG. 2 is shown elevated above the left-hand end of the roller 42, whereas the right-hand end of the roller 42 is above the right-hand end of the roller 41. Stated another way, the axes of the rollers 41, 42 cross substantially mid-way between the ends of the rollers 41, 42, and the reason therefor is to advance, convey or transport the rims/wheels from right-to-left, as viewed in FIGS. 1 and 2, when the rollers 41, 42 are rotated in the same direction, which is clockwise in FIG. 3. The rollers 41, 42 are driven clockwise by means of a conventional electrical motor 45 (FIG. 3) having a pulley 46 rotated in a clockwise direction to similarly drive a pulley belt 47 which is in turn entrained about pulleys 48, 49 connected to the respective rollers 41, 42. The motor 45 is selectively energized from an electrical power source (not shown) by manipulating conventional switches 51 (FIG. 1). When the rollers 41, 42 are rotated clockwise, as viewed in FIG. 3, the rim wheel R supported thereby on its beads B1 is rotated counter-clockwise, as viewed in FIG. 3, and due to the vertical offsetting of the rollers 41, 42 heretofore noted, the rim/wheel R not only rotates about its axis but also moves parallel to its axis from right-to-left, as viewed in FIGS. 1 and 2, from the elevating station 12 toward the lowering station 16 during a refinishing operation when, of course, the rollers 41, 42 are being driven by energization of the motor 45. The motor 45 can be, of course, a variable speed motor to control the rate of transport or travel of the rims/wheels R during the operation of the machine 10.

The high-pressure, hot water washing and degreasing station 13 includes means 50 defining a generally rectangular chamber or housing essentially closed at its top, bottom, rear and opposite sides, but having a front wall 51 provided with a generally rectangular opening 52. The opening 52 is aligned with the platform 20 of the elevating station 12 so that each rim/wheel R can be manually rolled from the ramp plate 22 (FIG. 3) across the rollers 42, 41, whether stationary or driven, and into the chamber 50 through the opening 52 thereof. In order to assist in this transfer the upper portion (unnumbered) of the ramp plate 22 at the elevating station 12 has a plate 54 welded between the side guide plates 23 and projects slightly past the roller 42 (FIG. 3) when the platform 20 has been elevated. The plate 45 thereby provides a transition surface over which the wheel/rim R can be rolled, and like transition surfaces can be so provided, if necessary, by welding suitable plates 55, 56 to the framework 11 and the housing 50.

A generally rectangular door 60 provided with appropriate seals can be reciprocated up and down to respectively open and close the opening 52. Suitable lateral vertical guides or tracks 61, 62 received lateral edges (unnumbered) of the door 60 and guide its reciprocal motion upwardly and downwardly under the influence of door moving means 65 in the form of a fluid cylinder 66 having a reciprocal rod 67 pivotally connected at 68 to the door 60. The cylinder 66 is pivotally connected at 69 to a bracket 70 which is in turn connected to an appropriate angular portion of the frame 11 (FIG. 1).

A ledge 72 (FIG. 3) forms a transition at the opening 52 of the chamber 50 for facilitating the rolling of each rim/wheel R into the housing 50 and upon a pair of generally parallel rollers 73, 74 which collectively define means for rotating each rim/wheel R when being treated in the chamber 50 with, of course, the door 60 closed. The rollers 73, 74 are conventionally journaled in the side walls (unnumbered) of the chamber 50, as is evident in FIG. 5, and each roller 73, 74 is driven through a pulley 75 (FIG. 5) connected to each roller 73, 74, a pulley belt 76 entrained thereabout and about a pulley 77 with the pulley 77 being driven by a conventional variable speed motor 78. An appropriate guard 80 houses the pulleys 75, 77 and the belt 76.

An appropriate reservoir 85 is provided in a lower portion of the chamber 50 in which water W is maintained at a predetermined height and is heated to a desired temperature (preferably 180° F.) by conventional gas burners 86 connected to a suitable gas source. An electric motor 87 operated by one of the switches 51 (FIG. 10 operates a conventional submersible pump 88 having an inlet (not shown) which draws the water W from the reservoir 85 and feeds it under high pressure through an outlet pipe 90 and a series of other pipes connected thereto and being closed by caps 91 through 96 (FIGS. 3 and 5) having elongated slits 97 for emitting therefrom high pressure hot sprays S of water W. The slit cap or nozzle 91 directs the spray S upwardly against the rotating rim/wheel R; the slit or nozzle 92 directs the spray from left-to-right, as viewed in FIG. 5, against the left bead of the rim/wheel; another opposing nozzle (not shown) in the same plane as the slit cap/nozzle 92 directs the spray from right-to-left in FIG. 5; and the pairs of slit caps or nozzles 93, 94 and 95, 96 direct the spray to the right and down and to the left and down, respectively, in FIG. 5. Because of this spray orientation and the rotation of the rim/wheel R, the entirety of the rim/wheel including internal, external and peripheral surfaces, are cleaned and degreased.

At the completion of the high-pressure hot water washing and degreasing operation, the rod 67 is retracted into the cylinder 66 (FIG. 3) thereby opening the door 60 and the rim R can be ejected from the chamber 50.

Figure 5:
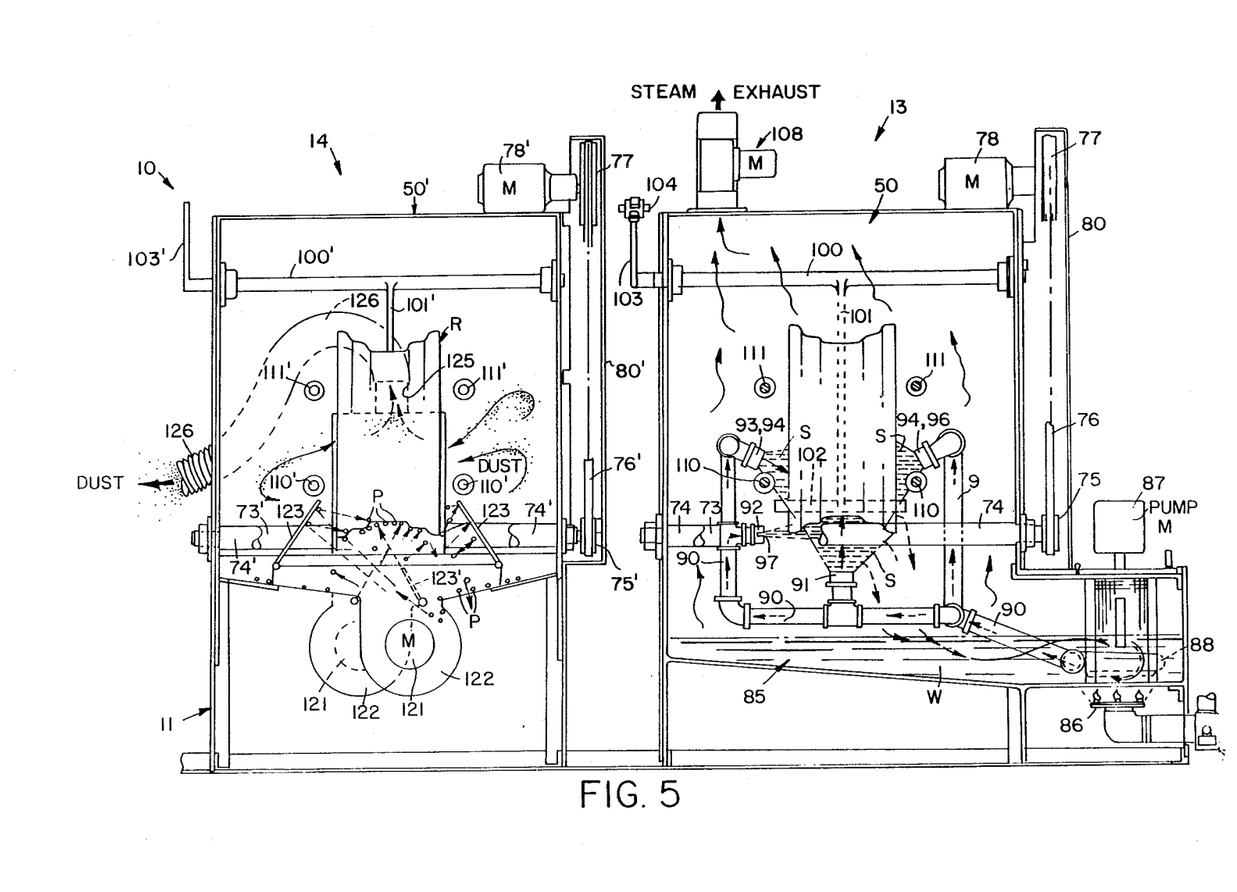
FIG. 5 is a vertical sectional view through the washing and degreasing chamber and the shot blast cleaning chamber, and illustrates details of the structures thereof and the manner in which a rim/wheel is cleaned thereby.

Means for ejecting the rim/wheel R from the chamber 50 includes a cylindrical rod 100 (FIG. 5) journaled in the side walls (unnumbered) of the chamber or housing 50, and carrying centrally thereof a depending arm 101 carrying a crossbar 102. An end of the rod 100 outside of the housing 50 carries a crank arm 103 which is connected by a pivot 104 to a rod 105 of a fluid cylinder 106 having rod and cylinder ends connected to suitable sources of compressed air and operated by appropriate solenoids through one of the switches 51 or one of the foot pedals 35, as desired. The cylinder 106 is connected by a pivot 107 to the housing 50. With the rod 105 fully retracted in the cylinder 106, the arm 101 and the crossbar 102 occupy the position shown in FIG. 3 spaced remote from the door 60 and the opening 52. However, when the rod 105 is extended, the arm 101 pivots counterclockwise, as viewed in FIG. 3, causing the crossbar 102 to engage the wheel/rim R and push the same outwardly through the opening 52 and upon he rollers 41, 42. Of course, the door 60 should not be opened until the motor 87 has been deenergized and the spray S from the associated nozzles 91 through 96 has stopped. All of this can be done manually or through appropriate interlocks which perform no part of the present invention. Furthermore, an appropriate exhaust opening (unnumbered) is provided in the housing 50 and is suitably vented to atmosphere by an appropriate fan and motor which is generally designated by the reference numeral 108 (FIG. 5). Also, appropriate parallel guide rods 110, 111 (FIGS. 3 and 5) can be provided in the housing 50 to ensure that the rim/wheel R will be fed properly into and out of the chamber 50 and, of course, during the rotation thereof by the rollers 73, 74, guide rods 110, 111 will impart stability to the rim/wheel and assure rotation about a generally horizontal axis. Furthermore, the high pressure of the sprays S will not tip the rim/wheel R over upon either of its beads because of the stability offered by the rods 110, 111. Thus, the rods 110, 111 not only serve the purpose of guiding the introduction of the rim/wheel R into and out of the housing 50, but also provide means for stabilizing the rim/wheel R with the axis horizontal during the high-pressure hot water washing and degreasing operation.

Once the rim/wheel R has been ejected from the high-pressure hot water washing and dereasing station 13, the beads B thereof rest upon the rollers 41, 42 which during the rotation thereof advance the rim/wheel R from the station 13 to the shot blast station 14.

The shot blast station 14 includes a housing 50' and other components identical the those of the station 13 and, thus, the same have been identically numbered and primed. Accordingly, once the washed and degreased rim/wheel R is advanced to the opening 52' or, absent washing and degreasing, elevated by the platform 20 of the elevating station 17 adjacent the opening 52', the rim/wheel R is manually rolled into the shot blast housing or chamber 50' past the rollers 42, 41 (FIG. 4) and upon rollers 73', 74' which are rotated by the electric motor 78',pulleys 75', 77', and the associated belt 76'. As the rim/wheel R rotates (FIGS. 4 and 5), shot blast means generally designated by the reference numberal 120 drive tiny metallic pieces P of shot against exterior and interior surfaces of the rim/wheel R by means of electrical driven motors 121 which rotate within housings 122 at high speeds in a generally upward direction, as viewed in FIG. 5. A plurality of deflector plates 123 are suitably mounted within the chamber 50' to intercept the pieces or shot blast P or portions thereof and redirect the blast, particularly toward the interior of the rim/wheel R to make certain that all surfaces thereof are totally cleansed. In an actual experimental working embodiment of this invention, the shot blast P removed all rust and scale from the rim/wheel R and up to seven layers of baked on paint from both the inside and outside of the rim/wheel R. Dust is withdrawn through an opening 125 in a rear wall (unnumbered) of the shot blast chamber 50' and is delivered via vacuum and an associated flexible pipe 126 to a self-contained dust collector housing 127 (FIG. 7) so as to preclude venting. The dust collector includes a suitable conventional filter for entraining dust, dirt and the like, and this can be discharged from the hopper 127 through a discharge door 128 (FIG. 1) at a truncated lower portion of the hopper 127. In addition, sine the shot blast P is directed at high velocity against the surface of the rim/wheel R, the metallic material is heated through friction, and this heat augments the drying of the subsequent applied polymeric coating material, as will be described immediately hereinafter. The door 60' is, of course, opened at the shot blast station 14 only after the shot blast motors 121 have been deenergized to preclude obvious damage, and thereafter the rim/wheel R is ejected from the chamber 50' by rolling about its horizontal axis by the crossbar 102', as is most evident from FIG. 4. Preferably a suitable reservoir or tray 130 having a discharge spout 131 (FIG. 2) is positioned between the rollers 41, 42 at the shot blast station 14 so that any of the shot blast P adhering thereto can be dislodged by, for example, manually bouncing the rim/wheel R, tipping the same over in either of two directions or both of two directions with the axis thereof vertical, etc. The shot blast exiting the spout 131 (FIG. 2) can be collected in a suitable container 132 and, of course, reinserted into the chamber 50' for continued use.

At the end of the shot blast operation, the rim/wheel R is transferred by the rollers 41, 42 to the coating or painting station 15 which includes a hood or chamber 140 having a entrance opening 141, an exit opening 142, and a generally rectangular front opening 143. A relatively large filter 144 (FIG. 6) spans a major portion of the rear of the hood or chamber 140 and defines therewith a permeable front wall of a manifold 145 which is connected by a duct 146 to an electric motor 147 for drawing air out of the hood, through the filter 144, as indicated by the unnumbered headed arrows in FIGS 6 and 8, to assure that coating material C issuing as a spray from a manual hand-held spray nozzle 150 will not adversely contaminate the general environment and meet existing OCEA and EPA standards. The coating material C includes a synthetic polymer or copolymer resin, and preferably is formed of the following components and proportions:

|   |           |                         |        |
|---|-----------|-------------------------|--------|
| A | 119 lb.   | 76 Resin 1018           | 82.35% |
|   | 12 oz.    | Colloids 681F           | .52%   |
| B | 11 oz.    | Aqua Ammonia            | .48%   |
|   | 16 oz.    | Water                   | .69%   |
| C | 13 oz.    | Anti-Rust Mixture       | .56%   |
|   | 5.9 oz.   | Surfynol 104 Surfactant | .25%   |
|   | 112 oz.   | Ethylene Glycol Butyl Ether | 4.84% |
| D | 105.6 oz. | Methyl Alcohol          | 4.57%  |
|   | 132.8 oz. | Water                   | 5.74%  |

Component A is first thoroughly mixed with high sheer agitation and components B, C and D are all individually thoroughly premixed. After premixing, component B is added to component A with high sheer agitation followed by the addition of premix C, again with high sheer agitation, followed by the addition of component D, again with high sheer agitation.

When the rim/wheel R are sprayed, as described earlier, a coating C of approximately 1-3 mm is obtained, and preferably a coating of a total thickness of 2 mm is preferable.

The 76 Resin 1018 is a trademark of Union Chemicals Division, Union Oil Company of California, 1900 East Gulf Road, Schaumburg, Ill. 60195. This resin is a styreneacrylate copolymer which is a milky fluid, dilutable in water, and having a boiling point of approximately 212° F. (100° C.). Additives include trace amounts of formaldehyde, surfactant, ammonia and the residule acrylamide, acrylate and styrene.

Colloid 681F is the tradename of a liquid anti-foam available from Colloids, Inc. 394 Frelinghuysen Avenue, Newark, N.J. 07114. Typical properties include:

| Appearance              | Off-White, opaque liquid |
|-------------------------|--------------------------|
| ph (5% dispersion) @ 25° C. | 5.5                  |
| Specific Gravity @ 25° C. | 0.88                   |
| Viscosity @ 25° C.; cps | 300                      |
| Pour Point, °C.         | −17° C.                  |
| Flash point (PMCC); °C. | 179                      |

Brookfield LVF, #2 spindle @ 60 RPM.

Aqua Ammonia (ammonia hydroxide—$NH_4OH$) is available from Occidental Chemical Corporation, Occidental Chemical Center, 360 Rainbow Boulevard, South, Box 728, Niagara Fall, N.Y., 14302. Typical physical data and ingredients are as follows:

PHYSICAL DATA

| Boiling Point (at 1 atm-29.4% Solution) 27° C. | Specific Gravity (25% solution) 0.91 (7.6 lbs/gal) |
|---|---|
| Melting point −98.3° F. | pH 14 |
| Solubility In Water Soluble at all concentrations | Vapor Pressure (mm Hg 20° C.) 390 |
| Appearance and Color Clear. colorless liquid with a pungent odor | Vapor Density (Air = 1) 0.6 |

| INGREDIENTS | Percent | Threshold Limit Values | |
|---|---|---|---|
| $NH_3$ | 24.5–25.5 | The TLV ® limits established by ACGIH (1984–85) are: | |
| | | TWA | STEL |
| | | 28 ppm | 35 ppm |
| | | 18 mg/m$^3$ | 27 mm/m$^3$ |
| Water | 74.5–75.5 | Not applicable | |

The anti-rust mixture is formed from a 128 oz. Water, 36 gram Sodium Nitrate and 11.5 oz. Sodium Benzioate.

Surfynol is a registered trademark of Air Products and Chemicals, Inc., Box 538, Allentown, Pa. 18105, and it is a proprietary mixture of the latter containing 2, 4, 7, 9, Tetramethyl-5-decyne-4, 7-diol (TMDD) 2-butoxyethanol (butyl cellosolve) (TMDD-$C_{14}H_{26}O_2$; 2-butoxyethanol-$C_6H_{14}O_2$) Typical physical data includes:

| Apearance | Clear, pale yellow liquid |
|---|---|
| Odor | Mild, methol-like |
| Boiling Point | 11° C..at 100 mm Hg |
| Specific Gravity ($H_2O$ = 1) | 0.903 @ 25° C. |
| Solubility in Water | <1% |
| Vapor Pressure | 11 mm Hg @ 25° C. |

Ethylene Glycol Butyl Ether is available from Dow Chemical U.S.A., Midland, Mich. 48674 under the registered trademark "Dowanol" having the following physical data:

| Boiling Point | 340° F. |
|---|---|
| Vap Press | 0.88 mmHg @ 25 C. |
| Vap Density | 4.10 |
| Sol. in Water | Infinitely |
| Sp. Gravity | .897 @ 25/25 C. |
| Appearance | Water white liquid |
| Odor | Ether-like odor |

Methyl alcohol (methanol) is readily available commercially (E.I. du Pont De Nemours & Co., Wilmington, Del. 19898.

When the latter-described coating material Ċ has been sprayed upon the rim/wheels R and the coating has dried, the appearance is virtually perfectly clear and transparent and that a thickness ranging from 1-3 mm, is quite resilient and, thus, acceptable for intimate contact and air-impervious sealing with an associated new or retread tire, the beads thereof and the associated valve.

In situations in which it is also desired to "paint" or color the rim 10, a pigmented formulation of the coating is obtained from the following formulation:

| A. | 2224.00 oz. | 76 Resin 1018 | 75.23% |
|----|-------------|---------------|--------|
|    | 5:72 oz. | Colloids 681F | .19% |
| B. | 305.40 oz. | Water | 10.33% |
|    | 11.60 oz | Aqua Ammonia | .39% |
| C. | 10.75 oz. | Potassium Tri Poly Phosphate | .36% |
| D. | 7.00 oz. | Surfynol 104BC Surfactant | .24% |
|    | 119.00 oz. | Ethylene Clycol Butyl Ether | 4.02% |
|    | 21.00 oz. | Anti Rust Mixture | .71% |
| E. | 8.00 oz. | Dowicil 75 Bactacide | .27% |
|    | 16.00 oz. | Water | .54% |
| F. | 95.00 oz. | Methyl Alcohol | 3.21% |
|    | 132.80 oz. | Water | 4.49% |

Component A is again mixed with high sheer agitation and premixed component B is then added to component A with high sheer agitation. Component C is also added to the latter admixture under high sheer agitation. Thereafter 12 to 50 pounds of dry titanium Dioxide is added with high sheer agitation until a minimum of °7 on the Hageman Gauge is attained. Color pigment is added (10 oz. to 50 oz.), as required to obtain the pigmentation desired. Premixed components D, E and F are then successively added one at a time to the latter admixture in succession, all with high sheer agitation. In this case the characteristics remain the same as the first-described coating C except, of course, the same is pigmented rather than being clear, but all remaining characteristics are the same.

Figure 7:
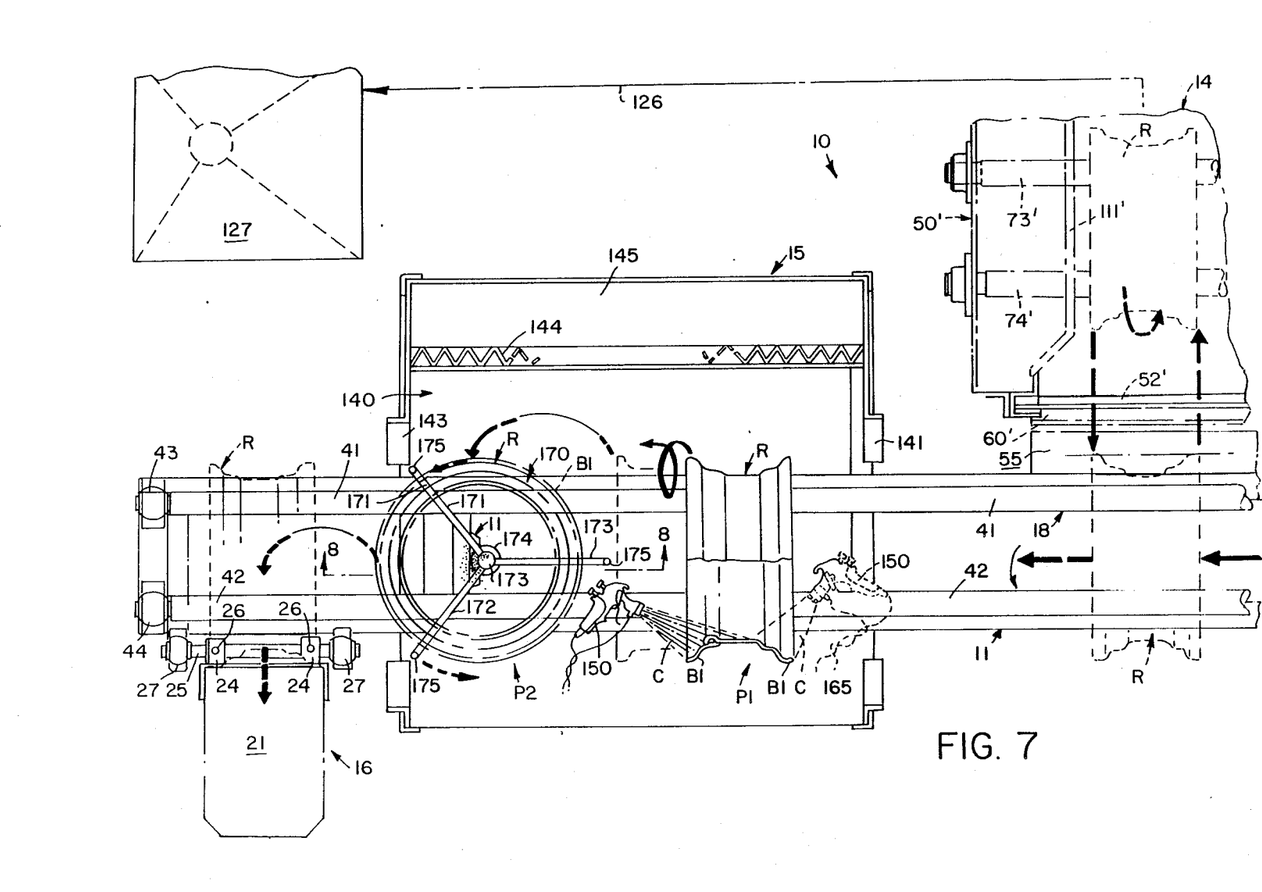
FIG. 7 is an enlarged fragmentary sectional view taken generally along line 7—7 of FIG. 2, and illustrates a rim/wheel being sprayed while rotated about a horizontal axis and subsequently being reoriented with its axis vertical for subsequent spraying.

The coating material C is contained in a suitably pressurized container or tank 160 (FIG. 6) and is conducted through a hose 161 to the nozzle 150 which is manually controlled by an operator to first apply the coating C to each rim/wheel R when its axis is in a horizontal plane and supported by its beads B1 upon the rollers or rolls 41, 42, as indicated at position P1 of FIG. 7. The operator thoroughly sprays the inside surface of each rim/wheel R from both sides, as indicated by the solid and phantom outline illustrated nozzles 150 at position P1 of FIG. 7. The nozzle 150 are shown directed outwardly away from the filter 144, but this is merely a manner of convenience and preferably the nozzles are directed 180 degrees from that illustrated so that any of the coating C which is not impinged against and adhered to each of the rims/wheels R is drawn toward, against and entrapped by the filter 144, as is most evident from FIG. 6 of the drawings. The reason the rim/wheel R is painted with its axis disposed generally horizontally at position P1 is to preclude the coating C from being applied to the axial ends and outermost peripheries of the beads B1 which would then cause this coating C to be transferred to the rollers 41, 42 as the rim/wheel R is transferred through its rotation and leftward movement under the influence of the rotating rollers 41, 42 from position P1 to position P2 (FIG. 7).

Figure 8:
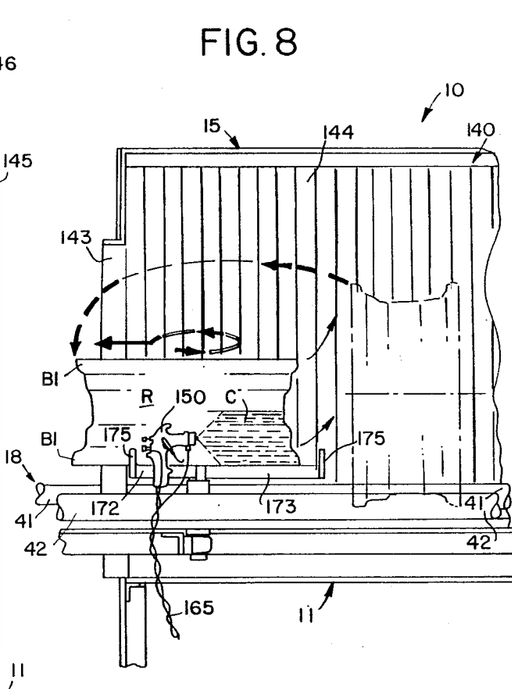

At position P2 the rim/wheel R is placed upon a turntable 170 having three arms 171 through 173 equally spaced from each other and radially outwardly emanating from the shaft 173 which is mounted for rotation in a journal 174 fixed to a portion of the frame 11. Each arm 171 through 173 has welded thereto an upwardly directed retaining pin 175 (FIGS. 6 and 8). When the rim/wheel R has been placed upon the arms 171 through 173, its axis is, of course, disposed vertially, and the operator then manually rotates the platform 172 and sprays the coating C from the nozzle 150 upon the exterior surface of the rim/wheel R including, of course, each of the beads B1 and particularly the circumferentially and radially outermost portions thereof. Thus, the beads B1 can now be sprayed with the coating C without adversely transerring the coating material C to the rollers 41, 42 or any other of the components of the overall machine 10.

As was earlier noted, the effect of the shot blast P is such as to heat each rim/wheel R and, thus, when the coating C is applied thereto by the spray nozzle 150 it dries extremely rapidly (approximately three minutes), which corresponds generally to the time that the rims/wheels R occupy the housings or chambers 50, 50'. Thus, as one rim/wheel R is being spray/coated, two other rims/wheels R are being respectively degreased and shot-blasted, respectively, while yet another rim/wheel R is being loaded at the elevating station 12 while a completely dried rim/wheel R is being lowered at the lowering station 16. Thus, in this fashion a single operator can rapidly, efficiently, effectively and with little effort effect degreasing/washing; shot-blasting; spray painting and associated loading and unloading in very little time at, of course, very little expense, thus creating a highly efficient system for refurbishing rims/wheels R for subsequent application thereof of new tires or retreads.

Although a preferred embodiment of the invention has been specifically illustrated and described herein, it is to be understood that minor variations may be made in the method without departing from the spirit and scope of the invention, as defined in the appended claims.

I claim:

1. A method of refinishing a rim/wheel comprising the steps of enclosing a rim/wheel in a first chamber, rotating the rim/wheel about its central axis while in the first chamber, performing a first liquid cleaning operation upon the rim/wheel while it rotates about its central axis in the first chamber, transferring the rim/wheel after the first liquid cleaning from the first chamber to a second chamber, rotating the rim/wheel about its central axis while in the second chamber, performing a second impact cleaning operation upon the rim/wheel while it rotates about its central axis in the second chamber, removing the rim/wheel from the second chamber after the second impact cleaning, applying a coating of protective material upon the rim/wheel, the second impact cleaning operation being performed by utilizing shot blast, the rim/wheel being subject to the shot blast cleaning operation for a time and intensity sufficient to elevate the skin temperature thereof to an elevated temperature, the protective material being heat-curable, and the applying step being performed while the skin temperature of the rim/wheel is elevated whereby the latent elevated temperature relatively immediately dries the heat-curable protective material.

2. The refinishing method as defined in claim 1 wherein said rotating steps are performed with the rim/wheel axis disposed generally horizontally.

3. The refinishing method as defined in claim 1 wherein the transferring step from the first chamber to the second chamber is performed by moving the rim/wheel generally parallel to its axis.

4. The refinishing method as defined in claim 1 including the steps of elevating the rim/wheel from a first position to a second higher position, and moving the rim/wheel from the second position into the first chamber.

5. The refinishing method as defined in claim 1 including the steps of elevating the rim/wheel from a first position to a second higher position, and rolling the rim/wheel about its central axis during movement of the rim/wheel from the second position into the first chamber.

6. The refinishing method as defined in claim 1 including the steps of elevating the rim/wheel from a first position to a second higher position along an arcuate path of travel, and moving the rim/wheel from the second position into the first chamber.

7. The refinishing method as defined in claim 1 including the steps of elevating the rim/wheel from a first position to a second higher position along an arcuate path of travel, and rolling the rim/wheel about its central axis from the second position into the first chamber.

8. The refinishing method as defined in claim 1 including the step of lowering the rim/wheel from a first elevated position at which the coating-applying step is performed to a second lower position.

9. The refinishing method as defined in claim 1 including the step of lowering the rim/wheel along an arcuate path of the travel from a first elevated position at which the coating-applying step is performed to a second lower position.

10. The refinishing method as defined in claim 1 wherein the coating-applying step is performed with the rim/wheel central axis disposed generally horizontally.

11. The refinishing method as defined in claim 1 wherein the coating-applying step is performed with the rim/wheel central axis disposed generally vertically.

12. The refinishing method as defined in claim 1 wherein the coating-applying step is performed in successive coating-applying stages with the rim/wheel central axis disposed in two different planes.

13. The refinishing method as defined in claim 1 wherein the coating-applying step is performed in successive coating-applying stages with the rim/wheel central axis disposed in two different planes offset generally 90 degrees from each other.

14. The refinishing method as defined in claim 1 wherein the coating-applying step is performed by spraying.

15. The refinishing method as defined in claim 1 wherein the coating-applying step is performed by spraying in successive stages with the rim/wheel central axis first disposed generally horizontally and thereafter disposed generally vertically.

16. The refinishing method as defined in claim 1 wherein the rim/wheel includes a pair of beads completely peripherally coated by the coating applying step; the method being further characterized by placing a tire upon the coated rim/wheel, and pressurizing the tire to bring beads of the tire into intimate peripheral resilient sealing relationship with the coating of the rim/wheel beads.

17. The refinishing method as defined in claim 1 wherein the transferring of the rim/wheel is performed along a predetermined path of travel extending at least between the first and second chambers, and the path of travel and the rim/wheel axis are disposed in generally parallel relationship during the movement of the rim/wheel along the predetermined path of travel.

18. The refinishing method as defined in claim 1 wherein the step of transferring the rim/wheel is performed along a predetermined path of travel which includes a generally linear first path portion between the first and second chambers, and at least a generally linear second path portion transverse to the first path portion along which the rims/wheels are transported into and out of at least one of the first and second chambers.

19. The refinishing method as defined in claim 1 wherein the transferring of the rim/wheel is performed along a predetermined path of travel which includes a generally linear first path portion between the first and second chambers, and at least two generally linear second and third path portions transverse to the first path portion along which the rim/wheels are transported out of at least one of said first and second chambers.

20. The refinishing method as defined in claim 1 wherein the coating-applying step is performed in two separate coating-applying stages.

21. The refinishing method as defined in claim 1 wherein the rim/wheel includes a valve opening which is completely peripherally coated during the coating-applying step; the method further being characterized by inserting a valve stem into and in sealing relationship with the coating of the valve opening.

22. The refinishing method as defined in claim 1 wherein said first liquid cleaning operation is performed by utilizing hot liquid.

23. The refinishing method as defined in claim 1 wherein said first liquid cleaning operation is performed by utilizing hot liquid and the second impact cleaning operation is performed by utilizing shot blast.

24. The refinishing method as defined in claim 1 wherein the liquid cleaning operation is performed by utilizing a spray.

25. A method of refinishing a rim/wheel comprising the steps of conveying a rim/wheel along a first path of travel in a first direction between a starting position and a finishing position, conveying the rim/wheel along a second and generally reciprocal path of travel in a second direction generally transverse to the first path of travel to and from a first cleaning chamber, enclosing the rim/wheel in the first chamber, rotating the rim/wheel about its central axis while in the first chamber, performing a first liquid cleaning operation upon the rim/wheel while it rotates about its central axis in the first chamber, conveying the rim/wheel after the first liquid cleaning operation along a third generally reciprocal path of travel downstream of the second path of travel in a third direction generally transverse to the first direction to and from a second chamber, rotating the rim/wheel about its central axis while in the second chamber, performing a second impact cleaning operation upon the rim/wheel while it rotates about its central axis in the second chamber, removing the rim/wheel from the second chamber after the second impact cleaning and continuing the conveyance of the rim/wheel generally along the first path of travel to a coating station, applying a coating of protective material upon the rim/wheel at the coating station, the second impact cleaning operation being performed by utilizing shot blast, the rim/wheel being subject to the shot blast cleaning operation for a time and intensity sufficient to elevate the skin temperature thereof to an elevated temperature, the protective material being heat-curable, and the applying step being performed while the skin temperature of the rim/wheel is elevated whereby the latent elevated temperature relatively immediately dries the heat-curable protective material.

26. The refinishing method as defined in claim 25 including the step of directing a liquid spray against the rim/wheel during the first liquid cleaning operation.

27. The refinishing method as defined in claim 25 including the step of directing a liquid spray against the rim/wheel during the first liquid cleaning operation, directing shot blast against the rim/wheel during the second impact cleaning operation, and performing the liquid spraying and shot-blasting steps before the performance of the coating step.

28. The refinishing method as defined in claim 25 wherein the step of rotating the rim/wheel about its central axis during the first liquid cleaning operation takes place with the central axis disposed generally horizontally.

29. The method of refinishing a rim/wheel as defined in claim 25 wherein the step of rotating the rim/wheel about its axis during the second impact cleaning operation takes place with the central axis disposed generally horizontally.

30. The method of refinishing a rim/wheel as defined in claim 25 including the step maintaining the central axis of the rim/wheel disposed generally horizontally during the performance of the first liquid and second impact cleaning operations.

31. The refinishing method as defined in claim 25 wherein the rim/wheel includes a peripheral surface and at least one of the rim/wheel rotating steps is performed by supporting the rim/wheel with its peripheral surface resting upon and being rotated by a moving surface.

* * * * *